United States Patent
Paycher et al.

(10) Patent No.: US 9,483,429 B2
(45) Date of Patent: Nov. 1, 2016

(54) UNIFIED INPUT/OUTPUT CONTROLLER FOR INTEGRATED WIRELESS DEVICES

(75) Inventors: Alon Paycher, Moshav Beith-Hananya (IL); Eli Dekel, Tzur Igal (IL); Avi Baum, Givat Shmuel (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1228 days.

(21) Appl. No.: 12/172,746

(22) Filed: Jul. 14, 2008

(65) Prior Publication Data

US 2010/0011128 A1    Jan. 14, 2010

(51) Int. Cl.
*G06F 13/12* (2006.01)
*G06F 13/38* (2006.01)
*G06F 13/10* (2006.01)

(52) U.S. Cl.
CPC .......... *G06F 13/385* (2013.01); *G06F 13/102* (2013.01); *G06F 2213/0038* (2013.01); *G06F 2213/3804* (2013.01); *G06F 2213/3814* (2013.01); *Y02B 60/1228* (2013.01); *Y02B 60/1235* (2013.01)

(58) Field of Classification Search
CPC .............. G06F 13/385; G06F 13/102; Y02B 60/1235; Y02B 60/1228
USPC ............................................ 710/106, 63, 64
See application file for complete search history.

(56) References Cited

U.S. PATENT DOCUMENTS

| | | | |
|---|---|---|---|
| 7,197,583 B2 | 3/2007 | Takinosawa et al. | 710/62 |
| 7,269,400 B2 * | 9/2007 | Lazzarotto et al. | 455/226.1 |
| 7,920,527 B2 * | 4/2011 | Rakshani et al. | 370/335 |
| 2005/0286466 A1 * | 12/2005 | Tagg et al. | 370/329 |
| 2006/0007151 A1 * | 1/2006 | Ram | 345/163 |
| 2006/0056620 A1 * | 3/2006 | Shingal et al. | 380/28 |
| 2006/0130099 A1 * | 6/2006 | Rooyen | 725/62 |
| 2007/0018890 A1 * | 1/2007 | Kulyukin | 342/357.14 |
| 2007/0080736 A1 * | 4/2007 | Castaneda et al. | 327/268 |
| 2008/0013569 A1 * | 1/2008 | Boren | 370/466 |
| 2008/0235418 A1 * | 9/2008 | Werthen et al. | 710/106 |
| 2008/0313382 A1 * | 12/2008 | Nurmi et al. | 710/314 |
| 2009/0006677 A1 * | 1/2009 | Rofougaran | 710/63 |
| 2009/0198859 A1 * | 8/2009 | Orishko et al. | 710/313 |

OTHER PUBLICATIONS

SD Specifications, Part E1, SDIO Specification, Version 2.00 Draft, Oct. 12, 2006, pp. 1-97.
"Supporting Multiple SD Devices with CoolRunner-II CPLDs", XAPP906 (v1.1) (Xilinx, Inc., Sep. 14, 2007), pp. 1-8.
"Multiplexing SDIO Devices Using MAX II CPLDs", Application Note 509 (Altera Corporation, Dec. 2007), pp. 1-7.
Wikipedia entry "USB Hub: Protocol", available at http://en.wikipedia.org/wiki/USB_hub#Protocol.
Universal Serial Bus Specification, Revision 1.1 (Compaq Computer Corporation, Intel Corporation, Microsoft Corporation, NEC Corporation;1998), §§5.2.3, 5.2.4.
Universal Serial Bus Specification, Revision 2.0 (Compaq Computer Corporation, Hewlett-Packard Company, Intel Corporation, Lucent Technologies, Inc, Microsoft Corporation, NEC Corporation, Koninklijke Philips Electronics N.V.; 2000), §§5.2.3, 5.2.4.

* cited by examiner

*Primary Examiner* — Ernest Unelus
(74) *Attorney, Agent, or Firm* — Ronald O. Neerings; Frank D. Cimino

(57) ABSTRACT

A novel and useful apparatus for and method of a unified IO controller well suited for use in integrated wireless devices incorporating multiple functions. The unified IO controller is operative to provide a single host interface PHY/MAC that is shared among all functions on the controller. The invention provides an IO protocol handler comprising common and unified logic that provides IO access to any function on the device. The common and unified IO PHY interface logic is shared between multiple functions within the same device (e.g., WLAN, GPS, Bluetooth, etc.). This implementation provides optimized hardware partitioning in which common SDIO logic serves multiple functions thereby eliminating the need to provide a protocol handler for each function, reducing pin count, power consumption and die size, since the SDIO protocol handling is implemented in a shared module.

12 Claims, 6 Drawing Sheets

UNIFIED INPUT/OUTPUT CONTROLLER FOR INTEGRATED WIRELESS DEVICES

FIELD OF THE INVENTION

The present invention relates to the field of data communications and more particularly relates to a unified IO controller particularly suitable for use with integrated wireless devices.

BACKGROUND OF THE INVENTION

Currently, there is huge demand for converged mobile devices which combine data, telephony and other function capabilities. Technological advances such as extremely low power consumption, improvements in form factor, pricing and co-existence technology for various wireless standards, e.g., 802.11 (WLAN) and Bluetooth, are fueling the demand.

A block diagram illustrating an example prior art multi-function mobile device in a wireless network system is shown in FIG. 1. The example wireless scenario, generally referenced 10, comprises a plurality of mobile devices 12 in communication with a cellular base station 14. The mobile device 12 comprises several functions in addition to the basic cellular transceiver 26, including a Bluetooth radio 18, FM receiver 20, GPS receiver 22 and WLAN radio.

As technology advances, more and more functions are being integrated on the same chip, e.g., Bluetooth, Global Positioning System (GPS), Wireless LAN (WLAN), etc. Historically, even when multiple functions were integrated on the same chip, each function had a different dedicated host interface with an associated driver.

A block diagram illustrating the prior art multifunction mobile device in more detail is shown in FIG. 2. The mobile device, generally referenced 30, comprises a multifunction device 32 in communication with host processor 34. The multifunction device comprises several functions each having its own separate host interface (which may sometimes be a different type), including Bluetooth radio 36, associated antenna 31 and host interface 44; GPS receiver 38, associated antenna 33 and host interface 46; FM receiver 40, associated antenna 35 and host interface 48; and WLAN radio 42, associated antenna 37 and host interface 49. The drawback to this is the requirement of providing a separate host interface for each function with the consequent increase in pin count, power consumption and die size (for the host interface logic circuitry assuming a single host interface chip is used) as well as increased complexity of host software due to the need to support multiple (and sometimes different) host interface drivers to connect to each function in the multifunction device.

Secure Digital Input Output (SDIO)

Secure Digital (SD) is a commonly used flash (non-volatile) memory card format developed by Matsushita, SanDisk, and Toshiba for use in portable devices. Today it is widely used in digital cameras, handheld computers, PDAs, mobile phones, GPS receivers, and video game consoles. SD card capacities currently range from 8 MB to 4 GB and from 4 GB to 32 GB for SDHC cards.

A Secure Digital Input Output or SDIO card is an interface that extends the functionality of devices with SD card slots. A variety of SDIO cards are being developed, such as a camera, Bluetooth, GPS, and 802.11b, modem, digital TV tuner, voice recorder, scanner, fingerprint recognition.

SD card slots can actually be used for more than flash memory cards. Devices that support SDIO, such as PDAs, laptops, cell phones, etc., can use small devices designed for the SD form factor, like GPS receivers, WiFi or Bluetooth adapters, modems, Ethernet adapters, barcode readers, IrDA adapters, FM radio tuners, TV tuners, RFID readers, digital cameras, mass storage media such as hard drives, RS-232 serial adapters, fingerprint scanners, SDIO to USB host/slave adapters to allow an SDIO-equipped handheld device to use USB peripherals and/or interface to PCs, magnetic strip readers, combination Bluetooth/WiFi/GPS transceivers, cellular modems (e.g., PCS, CDPD, GSM, etc.), and APRS/TNC adapters.

SDIO cards are fully compatible with SD Memory Card host controller (including mechanical, electrical, power, signaling and software). When an SDIO card is inserted into a non SDIO-aware host, it will not cause physical damage or disruption to the device or host controller. SPI bus topology is mandatory for SDIO, unlike SD Memory. Most of the SD Memory commands are not supported in SDIO. SDIO cards can contain up to eight separate logical cards.

Thus, the Secure Digital I/O standard extends SD memory capable systems to also support I/O peripherals such as bar code scanners, cameras, wireless adapters and GPS modules. The standard uses the same slot connector and slot mechanics and defines new I/O signaling protocols over existing pins. SDIO defines the same SD maximal clock rate of 25 MHz and uses 1 or 4 data pins. It creates a register level view of an SDIO function or multiple functions through a set of common registers and application specific registers. Newer versions of SDIO (e.g., SDIO2.0) are extending the maximal clock rate to 50 MHz, thus increasing the peak throughput to adhere to the market needs to have quicker storage devices, as well as the desire to support fast I/O peripherals such as WLAN 802.11g.

A card has one to eight (numbered 0-7) functions with function 0 reserved for common configuration. Each function is assigned a 128 KB register address space for configuration and operation. The common control register (CCR) set is implemented on every SDIO card and resides in the card address space for function 0. An SD host configures various operational parameters of the SDIO card through the common register set. A card containing one or more functions may have separate software modules (drivers) that operate on registers located in their specific address space. A wireless card may implement multiple wireless protocols (GPRS, WLAN or Bluetooth) with each radio existing as a separate I/O function utilizing separate control software (sometimes from different vendors).

SDIO data transactions are executed using CMD53 type commands. CMD53 can be used either in byte basis or block basis mode. When used in byte basis, CMD53 is capable of carrying up to a maximum, predefined, number of bytes per command. This maximum number of bytes is set by host-card negotiation that takes place when the host initializes the SDIO card. CMD53 can also be used in block-basis mode, during which consecutive blocks of data are all carried by the same CMD53. In the block-basis mode case, the size of each block shall be exactly identical to the maximal number of bytes, as negotiated for the byte basis mode. In case the host wants to transfer data which is smaller in size to the above maximum number, it must use byte-basis transaction.

When the host reads data from the card, the card is responsible for regulating the data; the host waits for the card to drive the SDIO data line and signal "Start Bit" after which it reads the data. The card cannot stop once data read has begun and until the transaction ended (for byte-basis read) or until the block ended (for block basis read). At this point the card signals "Stop Bit" and can then hold the line until the next start bit. For host write transactions, the card is responsible for sending CRC status once the transaction ended (for byte-basis operations) or when any of the block write elapsed (for block basis operations). When supplying the CRC status response, the card is also allowed to drive the line to low value, indicating "busy" response. The host is not allowed to start the next transaction until the card has released the bus.

A problem with multifunction IO such as SDIO, however, is that depending on the number of functions, a large number of pins may be required to support the individual PHY interfaces. The integration of several functionalities within the same chip only exacerbates the problem considering the fact that chips are already mostly pin limited, In addition, besides the large pin count, separate PHY interfaces also increase the power consumption and die size of the chip.

Currently, most integrated chips implement one of two schemes: (1) a physically separate host interface which is dedicated per each function; or (2) a shared host interface at the physical level, whereby the interface lines are shared only at the physical level but then are demultiplexed inside the device and distributed to each function. Although this solution does decrease the pin count, it is expensive to implement in terms of implementation logic circuitry as it requires the use of multiple protocol handlers or parsers (one for each function) as well as logic circuitry to control the physical routing of the various interface lines.

There is thus a need for a partitioning scheme for a multifunction IO controller device that incorporates a common interface that is shared among all the functionalities on the chip. The multifunction IO controller device should enable the existence of multiple independent functions while sharing the same physical host interface thereby benefiting from the advantages of providing a shared interface to multiple functions.

SUMMARY OF THE INVENTION

The present invention is a novel and useful apparatus for and method of a unified IO controller well suited for use in integrated wireless devices incorporating multiple functions. The unified IO controller is operative to provide a single host interface PHY/MAC that is shared among all functions on the controller. The invention provides an IO protocol handler comprising common and unified logic that provides IO access to any function on the device.

The common and unified IO PHY interface logic is shared between multiple functions within the same device (e.g., WLAN, GPS, Bluetooth, Near Field Communications (NFC), wUSB, etc.). The unified IO slave controller is operative to handle all IO protocol aspects and presents a common and easily accessible interface to the various functions.

In one example embodiment, the invention utilizes the SDIO capability to multiplex a number of independent IO functions on the same SDIO slave device. This implementation provides optimized hardware partitioning in which common SDIO logic serves multiple functions thereby eliminating the need to provide a protocol handler for each function, reducing pin count, power consumption and die size, since the SDIO protocol handling is implemented in a shared module.

Although the mechanism of the present invention can be used in numerous types of communication systems, to aid in illustrating the principles of the present invention, the description of the multifunction IO controller is provided in the context of a communication device such as a cellular phone or mobile station incorporating one or more functions (e.g., Bluetooth, GPS, etc.). It is appreciated, however, that the invention is not limited to the example applications presented, whereas one skilled in the art can apply the principles of the invention to other communication systems as well without departing from the scope of the invention.

Several advantages of the unified multifunction IO controller of the present invention include (1) the interface is physically shared between functions; (2) sharing a single common host interface maximizes the shared logic between the various functions thereby reducing die size; (3) shared logic is operative to handle the IO PHY and link layers wherein all functions are seen as a single IO slave to the host which greatly reduces host software complexity; (4) hardware power partitioning on the controller chip is optimized as only the minimal necessary logic resides on the 'always on' power domain, therefore allowing other hardware logic to be turned off which significantly reduces power consumption; (5) the invention supports dynamic 'sleep' by the various functions, whereby each function can go to 'sleep' while the IO remains functional for other functions; (6) sharing a single common host interface requires a simplified host protocol stack and firmware driver implementation; (7) the host interface PHY sharing mechanism can be expanded to any number of functions; and (8) a well defined PHY/MAC interface towards each of the multiple hardware functions within the controller enables an ecosystem in which new functions can be easily integrated or removed with minimal integration, verification or host software design effort.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application. Specific Integrated Circuit (ASIC) or Field Programmable Gate Array (FPGA), or as functionally equivalent discrete hardware components.

There is thus provided in accordance with the invention, an input/output (I/O) controller comprising a common interface circuit coupled to and shared among one or more function modules and wherein the common interface circuit is operative to implement an I/O protocol and provide a common interface between a host and the one or more function modules.

There is also provided in accordance with the invention, a multifunction Input/Output (I/O) device comprising a plurality of function modules, a common I/O interface PHY coupled to and shared among the plurality of function modules and wherein the common I/O interface PHY is operative to implement an I/O protocol and provide a common interface between a host and the plurality of function modules.

There is further provided in accordance with the invention, a Secure Digital Input Output (SDIO) controller comprising a common SDIO PHY coupled to and shared among one or more functions and wherein the common SDIO PHY is operative to implement an I/O protocol and provide a common interface between a host and the one or more function modules.

There is also provided in accordance with the invention, a Secure Digital Input Output (SDIO) device comprising a plurality of function modules, a common SDIO PHY coupled to and shared among a plurality of functions and wherein the common SDIO PHY is operative to implement an I/O protocol and provide a common interface between a host and plurality of functions.

There is further provided in accordance with the invention, a mobile station comprising at least one radio transceiver for establishing a communications link to a remote device, a multifunction Input/Output (I/O) device, the multifunction I/O device comprising a plurality of function modules, a common I/O interface PHY circuit coupled to and shared among the plurality of function modules and wherein the common I/O interface PHY circuit is operative to implement an I/O protocol and provide a common interface between a host and the plurality of function modules.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
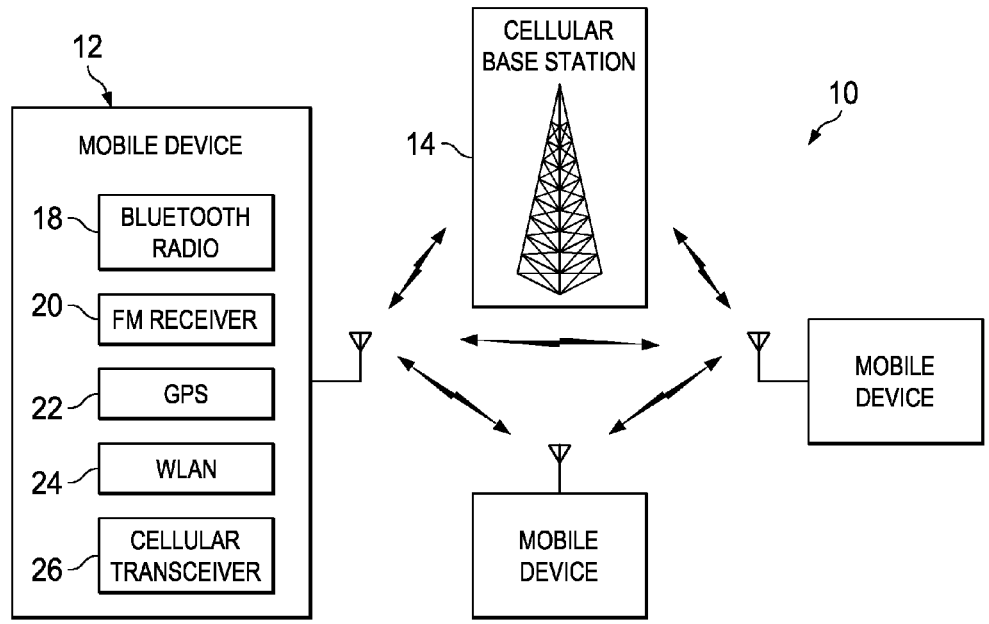
FIG. 1 is a block diagram illustrating an example prior art multifunction mobile device in a wireless network system.
Figure 2:
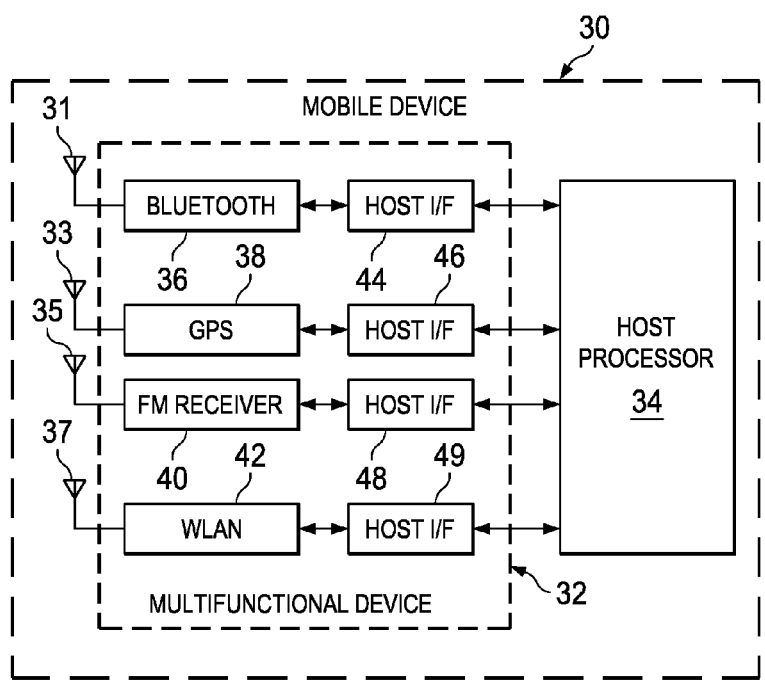
FIG. 2 is a block diagram illustrating the prior art multifunction mobile device in more detail.

The following notation is used throughout this document.

| Term | Definition |
|---|---|
| AAA | Authentication Authorization and Accounting |
| AC | Alternating Current |
| ADC | Analog to Digital Converter |
| API | Application Programming Interface |
| APRS | Automatic Packet Reporting System |
| ASIC | Application Specific Integrated Circuit |
| AVI | Audio Video Interleave |
| BMP | Windows Bitmap |
| BT | Bluetooth |
| CCCR | Card Common Control Register |
| CCR | Common Control Register |
| CDPD | Cellular Digital Packet Data |
| CIA | Common I/O Area |

-continued

| Term | Definition |
|---|---|
| CIS | Card Information Structure |
| CPU | Central Processing Unit |
| CRC | Cyclic Redundancy Code |
| DAC | Digital to Analog Converter |
| DC | Direct Current |
| DFC | Data Flow Controller |
| DSP | Digital Signal Processor |
| EDGE | Enhanced Data rates for GSM Evolution |
| ELP | Enhanced Low Power |
| EPROM | Erasable Programmable Read Only Memory |
| FBR | Function Basic Registers |
| FM | Frequency Modulation |
| FPGA | Field Programmable Gate Array |
| GPRS | General Packet Radio Service |
| GPS | Ground Positioning Satellite |
| GSM | Global System for Mobile Communications |
| HDL | Hardware Description Language |
| IEEE | Institute of Electrical and Electronics Engineers |
| IF | Intermediate Frequency |
| IMS | IP Multimedia Subsystem |
| IO | Input/Output |
| IP | Intellectual Property |
| ISIM | IP Multimedia Services Identity Module |
| JPG | Joint Photographic Experts Group |
| LAN | Local Area Network |
| LTE | Long Term Evolution |
| MAC | Media Access Control |
| MP3 | MPEG-1 Audio Layer 3 |
| MPG | Moving Picture Experts Group |
| NFC | Near Field Communications |
| OCP | Open Core Protocol |
| OFDMA | Orthogonal Frequency Division Multiple Access |
| PC | Personal Computer |
| PCI | Personal Computer Interconnect |
| PCS | Personal Communications Services |
| PDA | Portable Digital Assistant |
| PRCM | Power, Reset, Clock, Management |
| RAM | Random Access Memory |
| RAT | Radio Access Technology |
| RF | Radio Frequency |
| RFID | RF Identification |
| ROM | Read Only Memory |
| SD | Secure Digital |
| SDHC | SD High Capacity |
| SDIO | Secure Digital Input Output |
| SDIO | Secure Digital Input/Output |
| SIM | Subscriber Identity Module |
| SPI | Serial Peripheral Interface |
| TNC | Trusted Network Connect |
| TV | Television |
| UMTS | Universal Mobile Telecommunication System |
| USB | Universal Serial Bus |
| USIM | Universal Subscriber Identity Module |
| UWB | Ultra Wideband |
| WiFi | Wireless Fidelity |
| WiMax | Worldwide Interoperability for Microwave Access |
| WiMedia | Radio platform for UWB |
| WLAN | Wireless Local Area Network |
| WMA | Windows Media Audio |
| WMV | Windows Media Video |

DETAILED DESCRIPTION OF THE INVENTION

The present invention is a novel and useful apparatus for and method of a unified IO controller well suited for use in integrated wireless devices incorporating multiple functions. The unified IO controller is operative to provide a single host interface PHY/MAC that is shared among all functions on the controller. The invention provides an IO protocol handler comprising common and unified logic that provides IO access to any function on the device.

The common and unified IO PHY interface logic is shared between multiple functions within the same device (e.g., WLAN, GPS, Bluetooth, etc.). The unified IO slave controller is operative to handle all IO protocol aspects and presents a common and easily accessible interface to the various functions.

Although the mechanism of the present invention can be used in numerous types of communication systems, to aid in illustrating the principles of the present invention, the description of the unified IO controller is provided in the context of a communication device such as a cellular phone or mobile station incorporating one or more SDIO functions (e.g., Bluetooth, GPS, etc.). It is appreciated, however, that the invention is not limited to the example applications presented, whereas one skilled in the art can apply the principles of the invention to other communication systems and IO systems other than SDIO as well without departing from the scope of the invention.

Note that throughout this document, the term communications device is defined as any apparatus or mechanism adapted to transmit, receive or transmit and receive data through a medium. The term communications transceiver or communications device is defined as any apparatus or mechanism adapted to transmit and receive data through a medium. The communications device or communications transceiver may be adapted to communicate over any suitable medium, including wireless or wired media. Examples of wireless media include RF, infrared, optical, microwave, UWB, Bluetooth, WiMAX, WiMedia, WiFi, or any other broadband medium, etc. Examples of wired media include twisted pair, coaxial, optical fiber, any wired interface (e.g., USB, Firewire, Ethernet, etc.). The term Ethernet network is defined as a network compatible with any of the IEEE 802.3 Ethernet standards, including but not limited to 10Base-T, 100Base-T or 1000Base-T over shielded or unshielded twisted pair wiring. The terms communications channel, link and cable are used interchangeably.

The term multimedia player or device is defined as any apparatus having a display screen and user input means that is capable of playing audio (e.g., MP3, WMA, etc.), video (AVI, MPG, WMV, etc.) and/or pictures (JPG, BMP, etc.). The user input means is typically formed of one or more manually operated switches, buttons, wheels or other user input means. Examples of multimedia devices include pocket sized personal digital assistants (PDAs), personal media player/recorders, cellular telephones, handheld devices, and the like.

Some portions of the detailed descriptions which follow are presented in terms of procedures, logic blocks, processing, steps, and other symbolic representations of operations on data bits within a computer memory. These descriptions and representations are the means used by those skilled in the data processing arts to most effectively convey the substance of their work to others skilled in the art. A procedure, logic block, process, etc., is generally conceived to be a self-consistent sequence of steps or instructions leading to a desired result. The steps require physical manipulations of physical quantities. Usually, though not necessarily, these quantities take the form of electrical or magnetic signals capable of being stored, transferred, combined, compared and otherwise manipulated in a computer system. It has proven convenient at times, principally for reasons of common usage, to refer to these signals as bits, bytes, words, values, elements, symbols, characters, terms, numbers, or the like.

It should be born in mind that all of the above and similar terms are to be associated with the appropriate physical quantities they represent and are merely convenient labels applied to these quantities. Unless specifically stated otherwise as apparent from the following discussions, it is appreciated that throughout the present invention, discussions utilizing terms such as 'processing,' 'computing,' 'calculating,' 'determining,' 'displaying' or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention can take the form of an entirely hardware embodiment, an entirely software embodiment or an embodiment containing a combination of hardware and software elements. In one embodiment, a portion of the mechanism of the invention is implemented in software, which includes but is not limited to firmware, resident software, object code, assembly code, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium is any apparatus that can contain, store, communicate, propagate, or transport the program for use by or in connection with the instruction execution system, apparatus, or device, e.g., floppy disks, removable hard drives, computer files comprising source code or object code, flash semiconductor memory (USB flash drives, etc.), ROM, EPROM, or other semiconductor memory devices.

Mobile Device Incorporating the Shared I/O Interface

Figure 3:
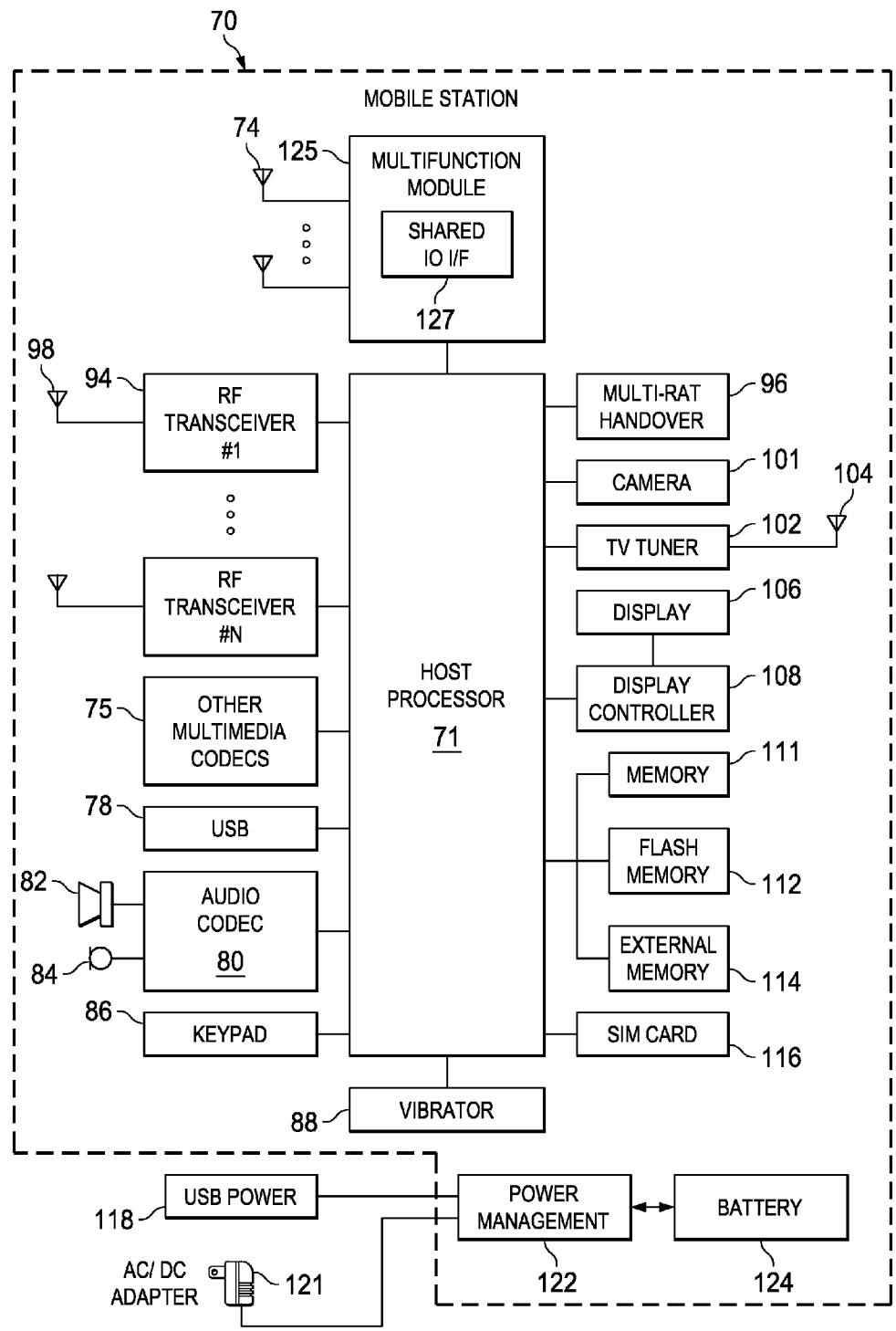
FIG. 3 is a general block diagram illustrating a communication device (shown generally as a mobile station or MS) incorporating the shared I/O interface of the present invention.

A general block diagram illustrating a communication device (shown generally as a mobile station or MS) incorporating the shared I/O interface of the present invention is shown in FIG. 3. Note that the mobile station may comprise any suitable wired or wireless device such as multimedia player, mobile communication device, cellular phone, smartphone, PDA, Bluetooth device, etc. For illustration purposes only, the device is shown as a mobile station. Note that this example is not intended to limit the scope of the invention as the shared I/O interface of the present invention can be implemented in a wide variety of communication devices.

The mobile station, generally referenced 70, comprises a host processor (i.e. baseband processor or CPU) 71 having analog and digital portions. The MS may comprise a plurality of RF transceivers 94 and associated antennas 98. RF transceivers for the basic cellular link and any number of other wireless standards and radio access technologies (RATs) may be included. Examples include, but are not limited to, Global System for Mobile Communication (GSM)/GPRS/EDGE 3 G; CDMA; WiMAX for providing WiMAX wireless connectivity when within the range of a WiMAX wireless network using OFDMA techniques; Bluetooth for providing Bluetooth wireless connectivity when within the range of a Bluetooth wireless network; WLAN for providing wireless connectivity when in a hot spot or within the range of an ad hoc, infrastructure or mesh based wireless LAN network; near field communications; 60 GHz device; UWB; etc. One or more of the RF transceivers may comprise a plurality of antennas to provide antenna diversity which yields improved radio performance. The mobile station may also comprise internal RAM and ROM memory 110, flash memory 112 and external memory 114.

Several user interface devices include microphone(s) 84, speaker(s) 82 and associated audio codec 80 or other multimedia codecs 75, a keypad for entering dialing digits 86, vibrator 88 for alerting a user, camera and related circuitry 100, a TV tuner 102 and associated antenna 104, display(s) 106 and associated display controller 108. A USB or other interface connection 78 (e.g., SPI, SDIO, PCI, etc.) provides a serial link to a user's PC or other device. SIM card 116 provides the interface to a user's SIM card for storing user data such as address book entries, etc. Note that the SIM card shown is intended to represent any type of smart card used for holding user related information such as identity and contact information, Authentication Authorization and Accounting (AAA), profile information, etc. Different standards use different names, for example, SIM for GSM, USIM for UMTS and ISIM for IMS and LTE.

The mobile station also comprises a multifunction module or device 125 which implements one or more functions such as Bluetooth, WLAN, GPS, FM receiver, etc. In accordance with the invention, the multifunction module comprises a unified IO interface controller 127 that interfaces all the functions to the host processor. The unified IO interface is adapted to implement the common shared IO interface mechanism of the present invention as described in more detail infra. In operation, shared IO interface controller 127 may be implemented as hardware, firmware, software or as a combination of hardware and firmware/software. Implemented as a firmware/software task, the program code operative to implement the shared IO interface mechanism of the present invention is stored in one or more memories 110, 112 or 114 or local memories within the host processor.

Portable power is provided by the battery 124 coupled to power management circuitry 122. External power is provided via USB power 118 or an AC/DC adapter 120 connected to the battery management circuitry which is operative to manage the charging and discharging of the battery 124.

Unified Shared IO PHY/MAC Interface

In one example embodiment, the invention utilizes the SDIO capability to multiplex a number of independent IO functions on the same SDIO slave device. This implementation provides optimized hardware partitioning in which common SDIO logic serves multiple functions thereby eliminating the need to provide a protocol handler for each function, reducing pin count, power consumption and die size, since the SDIO protocol handling is implemented in a shared module.

Figure 4:
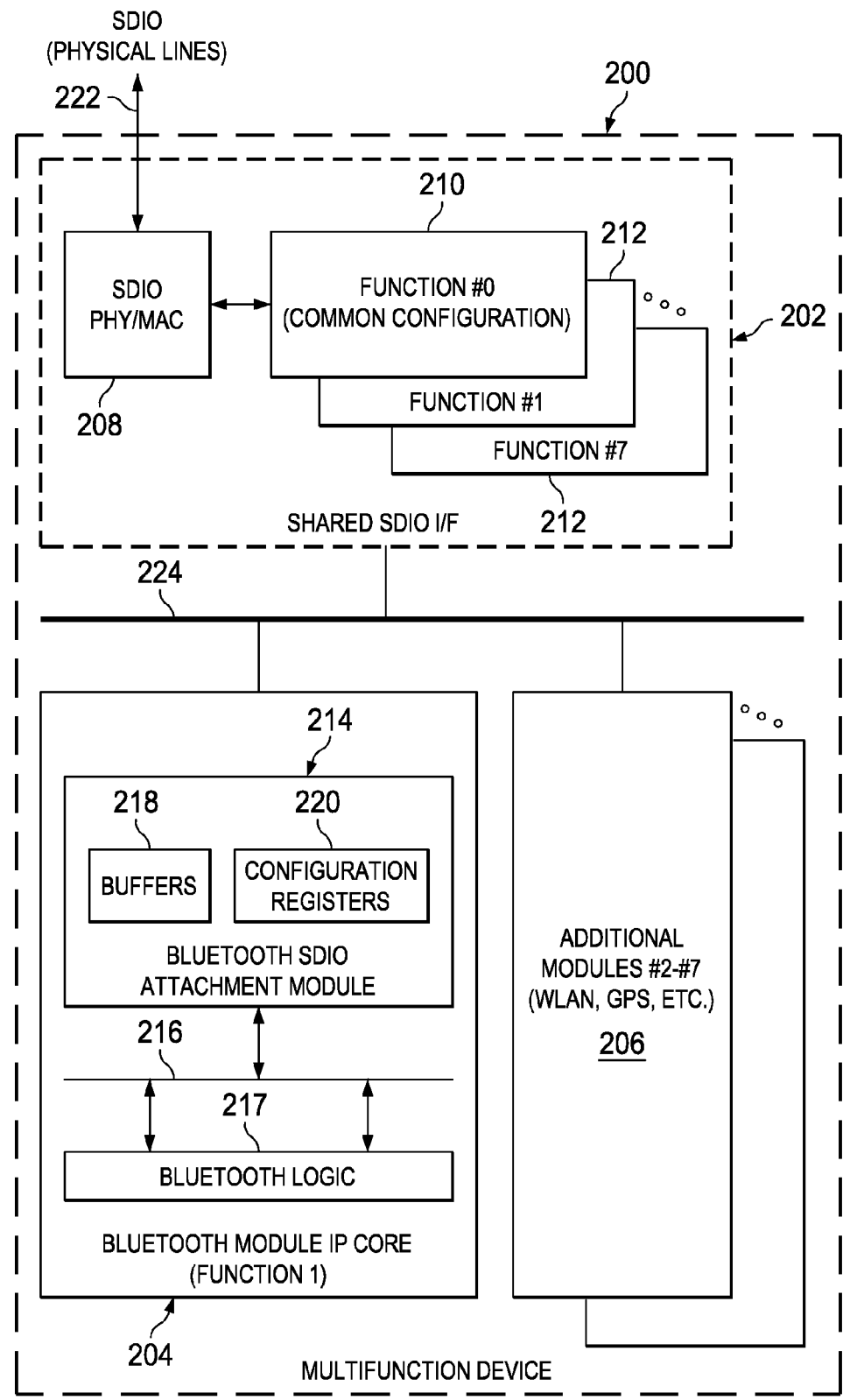
FIG. 4 is a block diagram illustrating an example embodiment of a multifunction device incorporating the I/O sharing interface of the present invention.

A block diagram illustrating an example embodiment of a multifunction device incorporating the I/O sharing interface of the present invention is shown in FIG. 4. The multifunction device, generally referenced 200, comprises a shared SDIO interface (I/F) 202, a Bluetooth module IP core 204 and additional modules 206. The Bluetooth module 204 (Function #1) is shown for example purposes only. The additional modules #2 through #7 comprise Functions #2 through #7, e.g., WLAN, GPS, etc.

The shared SDIO I/F 202 comprises an SDIO PHY/MAC block 208, Function #0 (common configuration) block 210 and additional Functions #1 through #7 blocks 212. Note that the SDIO standard can support up to eight functions with Function #0 being the common configuration shared by Functions #1 to #7. Note that the PHY/MAC comprises only Function #0. Transactions to Functions #1 through #7 are routed to the appropriate attachment module. The shared SDIO I/F communicates with Function blocks #1 to #7 via a bus 224. The bus may comprise any suitable bus and is not critical to operation of the invention. For example, the bus may comprise the well known Open Core Protocol (OCP) bus. The SDIO is operative interface all the Functions to the host via one set of SDIO physical interface lines 222.

The Bluetooth module 204 comprises a Bluetooth SDIO attachment module 214 in communication with Bluetooth logic and circuitry 217 via bus 216. The Bluetooth SDIO attachment module 214 comprises one or more buffers 218 and one or more configuration registers 220.

As shown in the Bluetooth Function module, every Function module in the multifunction device comprises an attachment module. The attachment module interfaces the particular function to the shared SDIO I/F. The host acts as an SDIO master to all of the Function modules, interfacing through the shared PHY/MAC module.

The shared SDIO PHY interface is operative to provide protocol handling for each IP module (i.e. SDIO function) in the controller. All IP modules, however, share the same SDIO interface. The physical SDIO module (SDIO PHY) is not implemented in the IP core, but rather, is extracted to top-level. A special interface is defined out of the SDIO PHY towards the various IP modules (e.g., Bluetooth, WLAN, GPS, etc). This interface enables sharing the PHY between different modules, and is 'SDIO Function Aware' in the sense that only the SDIO transactions that carry the proper function number are forwarded to the module with the same function.

For example, only SDIO transactions that carry Function number #1 (i.e. Bluetooth) are forwarded to the Bluetooth module. The Bluetooth SDIO module is attached to the OCP in the Bluetooth IP core 204. This attachment unit provides a bridge between the OCP and the SDIO PHY interfaces. The Bluetooth SDIO module implements the SDIO buffers and function specific features.

The SDIO specification defines several global ("per card") characteristics; for example the supported SDIO version, the supported bus width, etc. As these are global characteristics that are common to all functions within the card, they are all located on a special function, namely Function #0. This is the only function that is accessible after the card has been initialized. Using Function #0, the host processor reads the common card information including global characteristics as described above. Function #0 also serves to enable the additional, protocol specific functions (e.g. Bluetooth, WLAN, GPS, etc.) and to provide pointers to their specific configuration registers.

Figure 5:
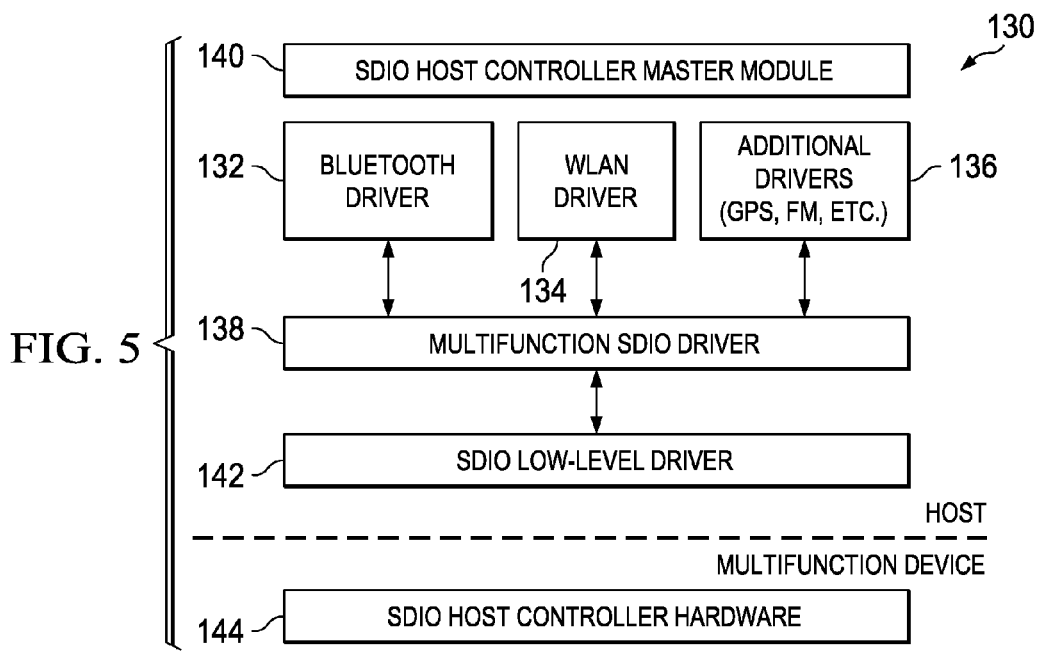
FIG. 5 is a block diagram illustrating an example embodiment of the software/firmware architecture of the present invention.

A block diagram illustrating an example embodiment of the software/firmware architecture of the present invention is shown in FIG. 5. The architecture, generally referenced 130, comprises, on the multifunction device side, SDIO host controller slave hardware 144 and on the host side, SDIO host controller master module 140, SDIO low-level driver 142, multifunction driver 138, Bluetooth driver 132, WLAN driver 134 and any additional drivers 136 for other functions (e.g., GPS, FM, etc.).

It is important to note that the drivers 132, 134, 136 are SDIO unaware. In operation, the multifunction driver 138 serves to take the place of multiple drivers. Thus, the SDIO low-level driver sees a single common driver rather than multiple drivers (one driver for each function).

The multifunction SDIO driver functions to manage the SDIO protocol logical layer and is responsible for the host driver initialization sequence. The multifunction SDIO driver provides standard transport read and write functionalities to any of the upper layer drivers (e.g., WLAN driver, Bluetooth driver, etc.) and translates any read or write request by the upper layer drivers into SDIO commands targeted to the proper function. The fact that the multifunction driver exposes standard read/write interface towards the upper layer drivers allows these drivers to be SDIO unaware, therefore minimizing driver implementation code. The multiple SDIO driver arbitrates between simultaneous requests by any of the upper layer drivers and therefore allows sharing the SDIO bus between the function drivers.

The Low Level SDIO driver is usually operating system (OS) and hardware dependant and used to translate the multifunction SDIO driver read/write requests into a specific hardware sequence that enables the SDIO host controller master hardware module to send the appropriate transaction on the SDIO bus.

Figure 6:
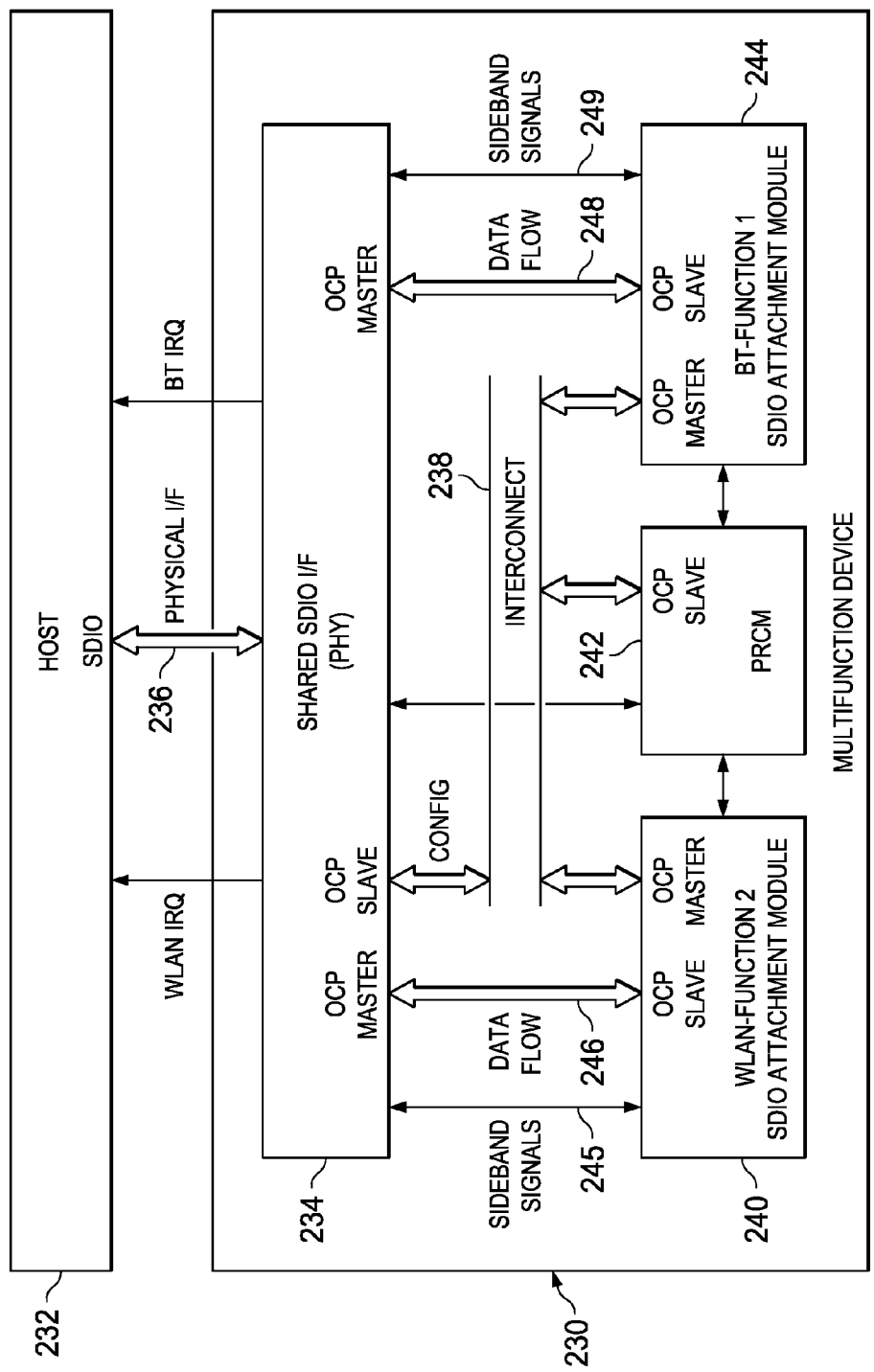
FIG. 6 is a block diagram illustrating an example embodiment multifunction device incorporating a shared SDIO interface.

A block diagram illustrating an example embodiment multifunction device incorporating a shared SDIO interface is shown in FIG. 6. In this example, the multifunction device, generally refereneced 230, comprises only two functions: Bluetooth Function #1 and WLAN Function #2. The multifunction device comprises shared SDIO PHY 234, interconnect bus 238, Bluetooth Function #1 SDIO attachment module 244, WLAN Function 2 SDIO attachment module 240, power, reset, clock and management (PRCM) module 242.

The shared SDIO interface communciates with the host 232 via physical interface lines 236. WLAN and Bluetooth IRQ lines are also input to the host for handling interrupts generated by the WLAN and Bluetooth modules, respectively.

The interface between the host and the multifunction device is a standard SDIO interface such as constructed in accordance with the SD Specifications, Version 2.0 Draft, October 2006.

The Function #0 block is located on the top-level chip partition. Function #0 registers can be read by and written to by each IP module using the access bus 238. Note that the IP modules only write to Function #0 register bits that are not shared among other functions, e.g., the Bluetooth Function Enable bit. Specific definitions of Function #0 properties that are controlled by the Bluetooth and WLAN functions are provided infra.

In this example embodiment, the SDIO interface is used for WLAN, Bluetooth or the combination of both WLAN and Bluetooth in multifunction mode, in which the same physical interface is used for the two IPs. The Bluetooth IP module is assigned Function #1 and the WLAN IP module is assigned Function #2. Function #0 is used for the common I/O area.

In accordance with the invention, the SDIO implementation is partitioned into two entities. One is the shared SDIO PHY, which is located in the top level and responsible for decoding host commands and routing the relevant data to/from the selected IP module. The second is SDIO block inside each IP module which is responsible for pushing and pulling data to and from the shared SDIO interface. The SDIO PHY in the top level also comprises the necessary Function #0 registers, since it is the common I/O area (Card Information Structure or CIS) that serves all IP modules (i.e. Bluetooth and WLAN) and can be accessed by the host even if the independent Functions #1, #2 are disabled (i.e. turned OFF).

The shared SDIO PHY 234 in the top level supports three interfaces with the IP modules: (1) a dedicated data flow OCP bus (246, 248) for each IP module (runs on the SDIO clock); (2) an InterConnect OCP bus 238 (the top level bus) used for SDIO PHY configuration by the IP modules (runs on the TOP clock); and (3) sideband signals (245, 249) used for any other reason, such as to convey specific real time and other information between the SDIO PHY module and each IP module, one set for each IP module according to the partitioning described below.

Bluetooth:
SDIO block start (1 bit): indicates that the SDIO PHY needs to write/read a new block to/from the Bluetooth IP.
SDIO block size (12 bits): updates the SDIO block size when the SDIO PHY needs to write/read a new block to/from the Bluetooth IP.
SDIO block direction (1 bit): updates the SDIO block direction when the SDIO PHY needs to write/read a new block to/from the Bluetooth IP.
SDIO block error (1 bit): an SDIO PHY indication that it has received a block with a CRC error.
BT_busy: the Bluetooth clock can be slower than the SDIO clock, allowing a data overrun or under run to occur. To prevent this, the Bluetooth IP module delivers a BT_busy signal to the SDIO PHY module. This signal is used to instruct the SDIO PHY to pause or delay the host from sending additional data, for cases when the Bluetooth module is slower than the SDIO line rate.
Function 1 ELP signal.
Bluetooth interrupt: used to interrupt the Bluetooth module if the host performs a configuration change (e.g., to one of the Function#0 registers that are relevant for the Bluetooth function.

WLAN:
wlan_ip_ready: indicates when the WLAN IP module is ready to operate.
Function 2 ELP signal.
WLAN interrupt: exhibits the same functionality as the Bluetooth interrupt.

Side band PRCM signals (used for reset management of the SDIO PHY module):
SDIO_BT_card_RST_REQ: Bluetooth card reset request indication sent from the SDIO PHY to the PRCM whenever a card reset command was received from the host and the Bluetooth (Function #1) was enabled.
SDIO_BT_REG_RST_REQ: Bluetooth reset request indication sent from the SDIO PHY to the PRCM whenever the host is writing to a dedicated register a bit which indicates the host is willing to reset the Bluetooth module.
SDIO_WLAN_card_RST_REQ: WLAN card reset request indication sent from the SDIO PHY to the PRCM whenever a reset command was received from the host and the WLAN (Function #2) was enabled.
SDIO_WLAN_REG_RST_REQ: WLAN reset request indication sent from the SDIO PHY to the PRCM whenever the host is writing to a dedicated register a bit which indicates the host is willing to reset the WLAN module.
SDIO_FM_REG_RST_REQ: FM reset request indication sent from the SDIO PHY to the PRCM whenever the host is writing to a dedicated register a bit which indicates the host is willing to reset the FM module.
SDIO_PHY_RST_REQ: SDIO card reset request indication sent from the SDIO PHY to the PRCM whenever a reset command was received from the host (Function #2) was enabled.

The SDIO interface is designed to run at the SDIO host clock domain as the host supplies a clock along with the SDIO interface lines. The host may stop the clock when the interface is idle (in most cases, hosts will actually drive the clock only during active SDIO transaction). From the data interface perspective, it is preferable to isolate the local IP clock domain from the SDIO clock domain in the data buffers, inside the SDIO attachment module of the IP module. In addition, since the chip modules can be put to sleep (i.e. local clock shut down), it is essential to have all the global (Function #0) registers work on the host clock domain so that they are accessible even when the Bluetooth module itself is sleeping or has not been initialized yet. Therefore, the SDIO PHY module (including SDIO PHY and Function #0 registers) is adapted to work on the SDIO host clock domain, while the synchronization to the local clock domain of each module is performed within each specific module. Note that the protocol specific function (e.g., the Bluetooth SDIO Function) is protected by sleep protocol and not expected to be accessed by the host before the protocol specific wakeup sequence is completed. The Wakeup sequence allows the module some time to turn on its clock before the host performs any data access.

The Function #0 configuration interface allows access to all Function #0 registers. The SDIO PHY allows configuration of Function #0 by any attachment module. Apart for the generic configuration interface, the SDIO PHY provides specific information to each of the IP modules using distinct lines such as the side-band signals 245, 249 (FIG. 6). A Function Enable line is provided to each Function's module. A Function Ready signal is received from each Function's module. A Card Reset line is provided to each Function's module. Block Size is provided to each Function's module (via the bus).

Function #0 and the Common I/O Area (CIA)

A Common I/O Area (CIA) is implemented in the shared SDIO interface. The CIA is accessed by the host via I/O reads and writes to Function #0. The registers within the CIA are provided to control the card configuration (global as well as per function). The CIA contains three distinct register structures: (1) The Card Common Control Register (CCCR); (2) Function Basic Registers (FBR); and (3) Card Information Structure (CIS).

Details of the properties of Function #0 will now be described. For each property, an owner entity is listed that is responsible for configuring it. A property owner may comprise either firmware within any of the chip IP modules or top level hardware. The Function #0 CCCR and FBR properties, including their owners, are described below in Table 1. Note that the term 'SDIO PHY' indicates the shared logic.

TABLE 1

Function #0 CCCR and FBR properties

| Structure | Property | Owner |
|---|---|---|
| CCCR | CCCR Format Version | Top Level Hardware |
| | SDIO Specification Revision Number | Top Level Hardware |
| | SDIO Format Version | Top Level Hardware |
| | Enable Function (per function bit) | Firmware/Module Hardware |
| | I/O Function Ready (per function bit) | Firmware/Module Hardware |
| | Interrupt Enable (per function bit) | Top Level Hardware |
| | Interrupt Enable Master (global bit) | Top Level Hardware |
| | Interrupt Pending (per function bit) | Top Level Hardware |
| | Abort Select | SDIO PHY |

TABLE 1-continued

Function #0 CCCR and FBR properties

| Structure | Property | Owner |
|---|---|---|
| | I/O Card Reset | SDIO PHY + Modules |
| | Bus Width | Top Level Hardware |
| | Connect/Disconnect pull-up on DAT3 | SDIO PHY |
| | Support Continuous SPI Interrupt | Top Level Hardware |
| | Enable Continuous SPI Interrupt | Top Level Hardware |
| | Supports CMD52 execution while data transfer is in progress | Top Level Hardware |
| | Multi-Block Support | Top Level Hardware |
| | Read-Wait Support | Top Level Hardware |
| | Suspend-Resume Support | Top Level Hardware |
| | Support Interrupt Between Blocks | Top Level Hardware |
| | Enable Interrupt Between Blocks | Top Level Hardware |
| | Low Speed Card | Top Level Hardware |
| | 4-bit Low Speed Card | Top Level Hardware |
| | Pointer to card's common CIS | SDIO PHY |
| | Bus Status | Top Level Hardware |
| | Bus Release | Top Level Hardware |
| | Select Function for Suspend/Resume | Top Level Hardware |
| | Resume Data Flag | Top Level Hardware |
| | Execution Flag Bits | Top Level Hardware |
| | Ready Flag Bits | Top Level Hardware |
| | Function#0 Block Size | SDIO PHY |
| | Supports Master Power Control | Top Level Hardware |
| | Enable Master Power Control | Top Level Hardware |
| | Reserved | Top Level Hardware |
| FBR | SDIO Standard Function Interface Code | Top Level Hardware |
| | Function Supports CSA | Top Level Hardware |
| | Function CSA Enable | Top Level Hardware |
| | Extended SDIO Standard Function IF Code | Top Level Hardware |
| | Supports Power Selection | Top Level Hardware |
| | Enable Power Selection | Top Level Hardware |
| | Address Pointer to Function CIS | Top Level Hardware |
| | Address Pointer to Function CSA | Top Level Hardware |
| | Data Access Window to CSA | Top Level Hardware |
| | Function I/O Block Size (per function) | Firmware/Module Hardware |

Figure 7:
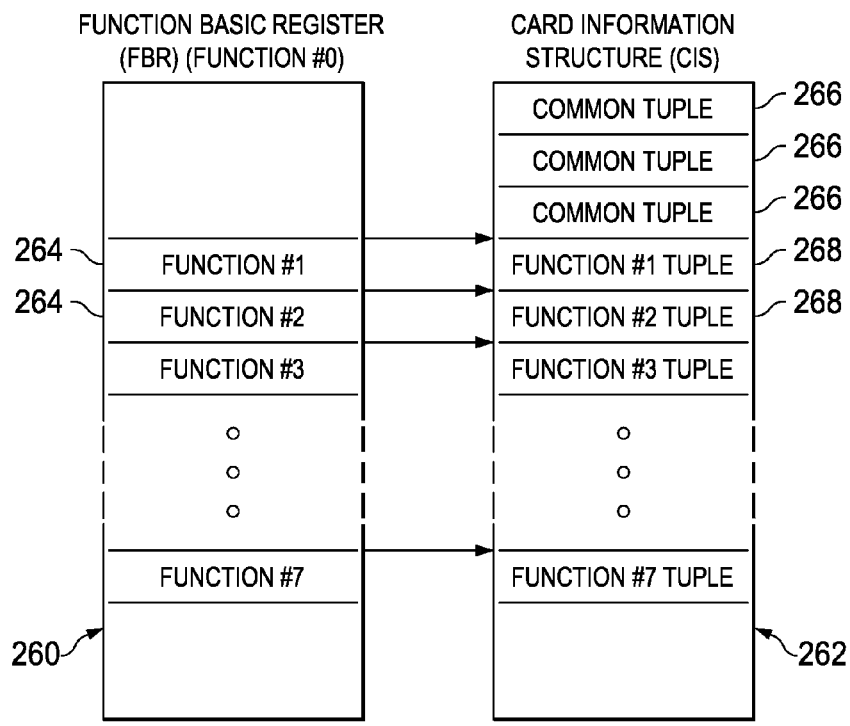
FIG. 7 is a diagram illustrating the Card Information Structure (CIS) and Function Basic Registers (FBR)

A diagram illustrating the Card Information Structure (CIS) and Function Basic Registers (FBR) is shown in FIG. 7. The Function Basic registers (FBR) for Function #0 are listed in block 260 while the Cad Information Structure (CIS) is listed in block 262. The shared SDIO PHY comprises a Card Information Structure (CIS) in the form of Tuples. The CIS provides more complete information about the multifunction device and the individual Functions. The CIS is constructed in the form of a linked list of Tuples. The first Tuples in the list 266 describe the common card configuration. Following the common Tuples, a per-function linked list is provided for each existing function 268 (Functions #1 to #7 for SDIO). Using the "Address Pointer to Function CIS" field in the FBR (see Table 1 supra) for each Function 264, the host can directly access the "head" of a function specific Tuple linked list. For a non-existing function, the address pointer is set to point to the end of the linked list. By inserting a "NULL" Tuple at the end of the list, the host can identify non-existing functions.

Note that the SDIO PHY is operative immediately after reset (without firmware intervention). The Tuples can be changed as part of the generic configuration bus. This is needed especially for the WLAN IP module which is a RAM device that is booted through the SDIO interface.

All Tuples within the CIS are typically handled by the top-level logic in order to permit the SDIO PHY is operative immediately after reset, without any firmware intervention. The Tuples, however, are accessible as a part of the generic configuration interface address space.

Note that for different applications, a different CIS is constructed. For example, in one example embodiment, the CIS indicates two operative functions (i.e. WLAN at Function #1 and SDIO at Function #2). In another example embodiment, the CIS indicates only one available function (i.e. Bluetooth at Function #2). Note also that the content of the CIS (either the common or per function Tuples) is assumed to be fixed as it describes hardware characteristics.

Example Bluetooth Module Incorporating an SDIO Attachment Module

Figure 8:
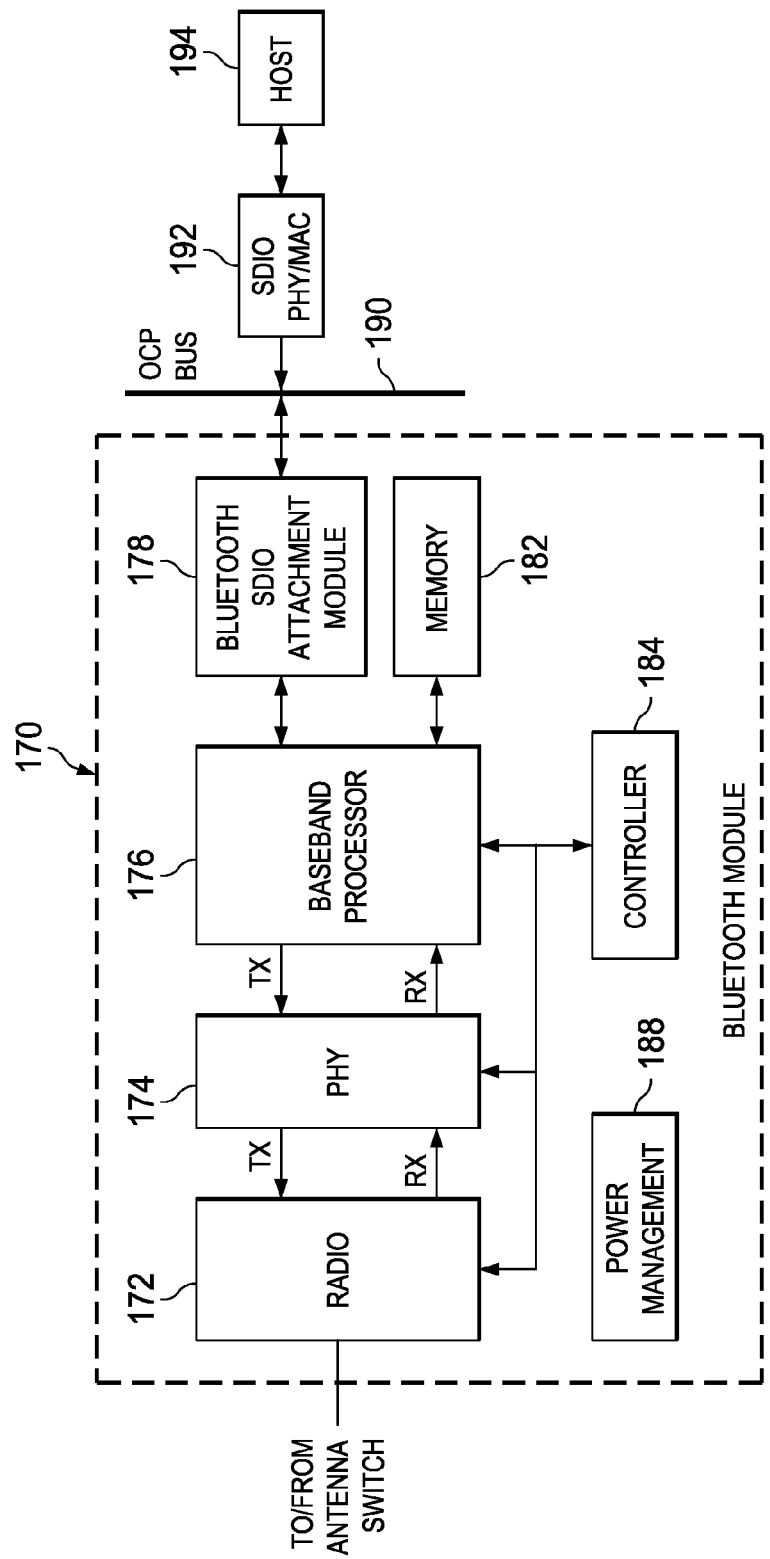
FIG. 8 is a block diagram illustrating an example Bluetooth module incorporating an example embodiment Bluetooth SDIO attachment module.

A block diagram illustrating an example Bluetooth module incorporating an example embodiment Bluetooth SDIO attachment module is shown in FIG. 8. The Bluetooth module (i.e. headset, cell phone, etc.), generally referenced 170, comprises Bluetooth SDIO attachment module 178 in communication the SDIO PHY/MAC block 192 via bus 190 (e.g., OCP bus). The SDIO PHY/MAC block 192 is operative to implement the unified IO interface mechanism of the present invention. The SDIO PHY/MAC block 192 interfaces with the host device 194. Note that the DSIO PHY/MAC block 192 may be external (as shown) to the Bluetooth module or may be incorporated within it along with the OCP bus 190.

The Bluetooth module also comprises baseband processor/MAC 176, memory 182, PHY circuit 174, Bluetooth radio 172, controller 184 and power management module 188. The radio circuitry 172 comprises an RF switch, bandpass filter, RF front end circuitry, bandpass filter, etc. (not shown). The PHY circuit 174 comprises I and Q signal analog to digital converters (ADCs) and I and Q signal digital to analog converters (DACs) (not shown). The memory 182 comprises any memory devices such as EEPROM, static RAM, FLASH memory, etc. necessary for operation of the processor/MAC. Note that in one embodiment, the mechanism of the invention is implemented as firmware/software that resides in memory 182 and executed on the baseband processor or other controller device or is implemented in hardware in the MAC layer in the processor 176. Alternatively, the mechanism may be implemented in the host or a combination of the host and baseband processor or may be implemented in the controller 184.

The RF front end circuit with the radio functions to filter and amplify RF signals and perform RF to IF conversion to generate I and Q data signals for the ADCs and DACs in the PHY. The baseband processor functions to modulate and demodulate I and Q data, perform carrier sensing, transmission and receiving of frames. The medium access controller (MAC) functions to control the communications (i.e. access) between the host device and applications. The power management circuit 188 is adapted to receive power via a wall adapter, battery and/or power via the host interface 180. The host interface may comprise PCI, CardBus or USB interfaces.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A multifunction Input/Output (I/O) device, comprising:
a plurality of I/O function modules;
a host physical interface; and
a shared interface coupled to said host physical interface and to said plurality of function modules, the shared interface comprising:
   a common configuration function comprising a register set for storing operational parameters common to all of the plurality of I/O function modules; and
   a physical layer block operative to decode host read/write requests received at said host physical interface, and to route data associated with the received read/write request between a selected one of the plurality of I/O function modules and the host physical interface.

2. The device according to claim 1, wherein said physical layer block is operative to route data associated with a received read/write request for a single selected I/O function module only to the single selected I/O function module.

3. The device according to claim 1, wherein said plurality of I/O function modules comprises one or more functions selected from the group consisting of Bluetooth, Global Positioning System (GPS), Wireless Local Area Network (WLAN) and Frequency Modulation (FM) radio.

4. The device according to claim 1, wherein each of the plurality of I/O function modules comprises:
an attachment module comprising one or more configuration registers and one or more synchronization buffers; and
logic circuitry for performing the I/O function of the I/O function module.

5. The device according to claim 1, further comprising:
a bus coupled between the physical layer block and each of the plurality of I/O function modules.

6. The device according to claim 5, wherein said bus comprises an Open Core Protocol compatible bus.

7. A Secure Digital Input Output (SDIO) multifunction device, comprising:
a plurality of function modules;
a host physical interface; and
a shared SDIO interface coupled to said host physical interface and to said plurality of function modules, the shared SDIO interface comprising:
   a common configuration function comprising a register set for storing operational parameters common to all of the plurality of function modules; and a physical layer block operative to decode host read/write requests corresponding to transactions according to the SDIO standard received at said host physical interface, and to route data associated with the received read/write requests between a selected one of the plurality of function modules and the host physical interface.

8. The device according to claim 7, wherein said physical layer block is operative to route data associated with a received host read/write request addressed to a single function module only to the addressed single function module.

9. The device according to claim 7, wherein said plurality of function modules comprises one or more functions selected from the group consisting of Bluetooth, Global Positioning System (GPS), Wireless Local Area Network (WLAN) and Frequency Modulation (FM) radio.

10. The device according to claim 7, wherein each of the plurality of function modules comprises:
   an attachment module comprising one or more configuration registers and one or more synchronization buffers; and
   logic circuitry for performing the I/O function of the I/O function module.

11. The device according to claim 7, further comprising:
   a bus coupled between the physical layer block and each of the plurality of function modules.

12. The device according to claim 11, wherein said bus comprises an Open Core Protocol compatible bus.

* * * * *